W. SCHULZE & H. A. SMITH.
SHUT-OFF VALVE.
APPLICATION FILED DEC. 8, 1911.
1,187,662.
Patented June 20, 1916.
2 SHEETS—SHEET 1.
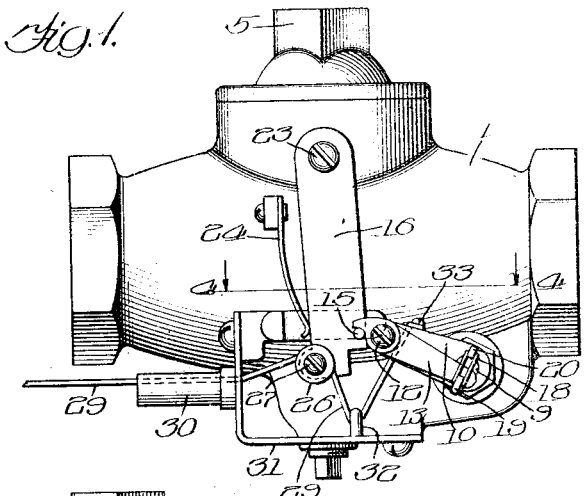
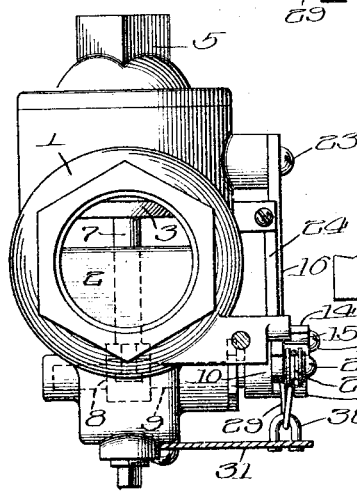
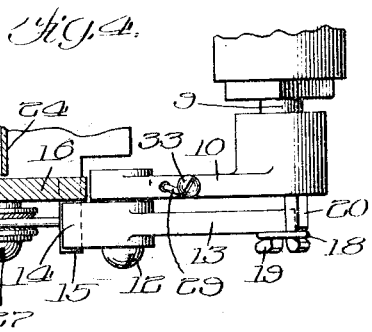
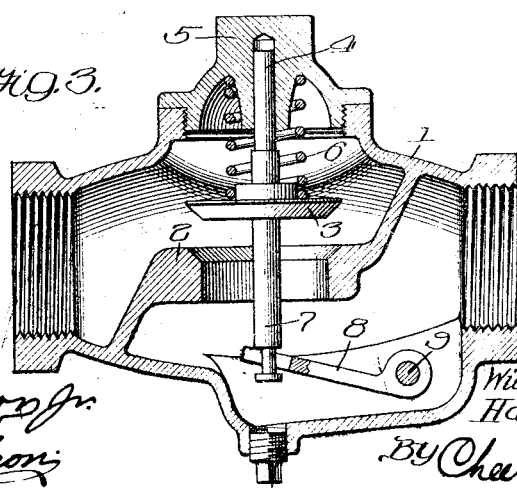
Witnesses:
Jno. H. Nelson Jr.
Edwin B. Nelson
Inventor:
William Schulze
Harry A. Smith
By Chaver & Cox Attys

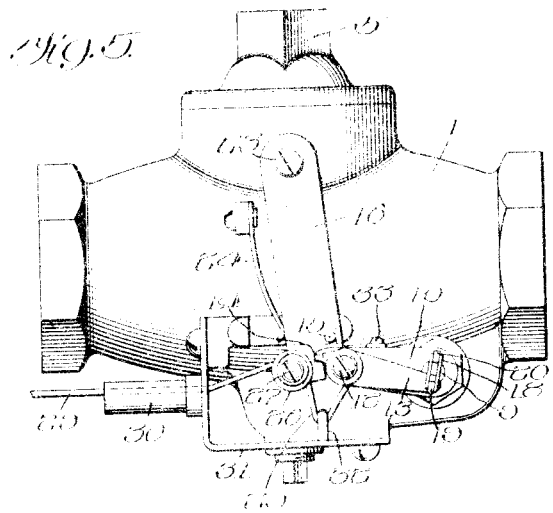

UNITED STATES PATENT OFFICE.

WILLIAM SCHULZE AND HARRY A. SMITH, OF CHICAGO, ILLINOIS, ASSIGNORS, BY MESNE ASSIGNMENTS, TO AUTOMATIC SAFETY GAS VALVE COMPANY, A CORPORATION OF DELAWARE.

SHUT-OFF VALVE.

1,187,662.

Specification of Letters Patent.

Patented June 20, 1916.

Application filed December 5, 1911. Serial No. 664,668.

*To all whom it may concern:*

Be it known that we, WILLIAM SCHULZE and HARRY A. SMITH, citizens of the United States, residing at Chicago, in the county of Cook and State of Illinois, have invented a certain new and useful Improvement in Shut-Off Valves, of which the following is a specification.

Our invention relates to shut-off valves for use, for example, in gas mains for shutting off the supply of gas from a building or the apartments of a building in case of fire or other emergency. It will be understood that valves for this purpose are usually provided with a spring for closing the valve in time of danger, and the valve is held open by a fusible link placed in exposed position so that it will be melted and release the valve in case there is any fire near it. Such valves have also been provided with hand releasable devices so that in case the seat of the fire is too remote or for some other reason fails to melt the link, the valve may be released by hand, thus permitting the spring to close the valve. The difficulty is, however, that through lack of use or damage by gas or other agencies the spring may fail to work. The objects of our invention are, first, to provide in a valve of this character means whereby a fireman or other person arriving at place of danger may release the valve by hand and by the same act positively close the valve, thus insuring closure whether the valve spring is operative or not; second, to provide means whereby after the valve has been released it will be automatically locked in closed position; third, to provide means for preventing accidental opening of the valve due to vibration of the apparatus.

We accomplish our objects by the mechanism illustrated in the accompanying drawings, in which—

Figure 1 is a side elevation of the complete valve. Fig. 2 is an end view thereof. Fig. 3 is a central vertical section thereof. Fig. 4 is a plan view of some of the operating parts on the line 4—4 Fig. 1. Fig. 5 is a side view of the valve showing the parts in locked position after the valve has been released, and Fig. 6 is a fragmentary perspective showing the relationship of the chief external operating parts.

Similar numerals refer to similar parts throughout the several views.

The valve casing 1 is provided with a valve seat 2 for the shut-off valve 3. The valve stem 4, which carries said valve is guided near its upper end in a screw cap 5 which forms a top closure for the top casing. Said valve is normally urged toward its seat by means of the compression spring 6. The lower extension 7 of the valve stem is adjustably connected to a lever 8 rigidly connected to a shaft 9, which extends out through the valve casing and has a lever 10 rigidly secured to its outer end. Extending outward from the free end of the lever 10 is a pin 12 which serves as a fulcrum for an auxiliary lever 13 having a nose 14 at its forward end adapted to rest upon a pin 15 carried in the lower end of a swinging arm 16. The relation of the parts is such that the force of the spring 6 acting downward is transmitted through the valve stem 7, lever 8, and shaft 9 to the main external lever 10 urging the latter to rotate in an anti clockwise direction, when viewed as in Fig. 1. This tends to depress fulcrum pin 12, and as the nose 14 is supported by the pin 15 the tendency is for the rear end of the lever 13 to descend or rotate about pin 12 in a clockwise direction, which tendency is overcome by a fusible link 18, connected at the lower end to a hook 19 on lever 13 and at the upper end to a hook on lever 10. Consequently under normal conditions there is a strain on link 18, and if the link becomes fused as a result of heat and releases the rear end of lever 13 the latter becomes free to rotate about pin 12, thus letting the nose 14 slip off of pin 15 and permit spring 6 to close the valve. As long as link 18 remains intact the levers 10 and 13 operate practically as a single piece and the holding of the nose 14 in raised position (as by pin 15) will hold the lever 10 and valve 3 in raised position. Arm 16 above mentioned is pivotally suspended from a pin 23 screwing into the valve casing. Said arm is normally urged by a spring 24 to the position shown in Fig. 1, where the pin 15 holds the lever 13 and 10 in raised position.

An anti friction sheave 26 is supported upon a pin 27 carried at the lower end of arm 16. A cord 29 leads from this sheave through an eye 30 supported upon a bracket 31 attached to the casing. From the sheave the cord passes through an eye 32 carried by the bracket below said sheave. From eye 32 the cord leads to the lever 10, where it is secured by any suitable means, for example, by the screw 33. The cord 29 in practice will be led to some convenient part of the building, where it will be readily accessible in time of danger. By referring especially to Figs. 1, 5 and 6 it will be seen that the sheave 26 deflects the cord in such manner that when the cord is pulled the tendency will be to move sheave 26 and arm 16 toward the left (Fig. 1) thus releasing levers 13 and 10 and permitting valve 3 to close under the action of spring 6. It may happen, however, due to the action of the element or to injury from other causes that spring 6 will fail to close the valve. In our device, however, the end of the cord is attached to lever 10, and the eye 32 is so located that a pull on the cord pulls said lever toward closed position; consequently it is immaterial whether the spring 6 is deflected to close the valve or not. The same pull which releases the levers 13 and 10 operates to positively close the valve.

The parts are so constructed that as soon as the arm 16 and pin 15 have released levers 10 and 15 and the latter have dropped to closed position, and the cord has been relaxed, the spring 24 throws arm 16 to the right and brings the lower end of the arm over the upper edge of lever 10. This serves to lock the valve in closed position and the valve cannot be again opened until the arm 16 has been pushed aside against the action of its spring 24 and may remain for the raising and resetting of the valve. It will thus be seen that in our device the same pull which releases the valve serves positively to close it, also that when the valve is closed it is automatically locked in closed position and remains so until the parts are manipulated to reset the valve.

Having thus described our invention, what we claim as new and desire to secure by Letters Patent is:—

1. A cut off valve comprising a valve casing, a valve adapted to seat in said casing, a spring tending to close said valve, a detent for holding said valve open, and a cord connected to said valve for positively closing it, said cord engaging said detent and tending to retract the same when the cord is pulled.

2. In combination, a valve casing, a valve tending to seat therein, a lever connected to the valve for controlling its movement, a detent engaging said lever for holding said valve open, and a pull cord attached to said lever for pulling it and thereby forcing the valve to closed position, said cord being deflected by said detent, and the force produced by a pull on the cord acting in a direction to retract said detent from said lever.

3. In combination, a valve casing, a valve tending to seat therein, a movable element connected to said valve for controlling its movement, a detent for engaging said movable element so as to hold valve in open position, a pull cord attached to said movable element for pulling it and thereby positively forcing the valve to closed position, said cord being deflected by said detent so as to retract the detent and release the movable element when the cord is pulled, and a spring operative upon said detent to urge it to a position behind said movable element to thereby lock the same after the detent has released said movable element and the cord has been finally relaxed.

4. In combination, a valve, a casing therefor, a spring urging said valve to close, a lever positively connected to said valve whereby the valve may be positively held in either raised or lowered position by said lever, a detent adapted to engage said lever on either one of two opposite sides of said lever, said detent when engaging one side of said lever holding it in the valve open position and said detent when engaging the other side of said lever holding it in the valve closed position, a spring urging said detent into engagement with the lever, and means for retracting said detent to release said lever to permit said valve to close, said means subsequently permitting said detent to return to position to hold said lever in valve closed position.

5. In combination, a valve, a casing therefor, a spring normally urging said valve to closed position, a main lever connected to the valve for controlling its movement, an auxiliary lever fulcrumed on the main lever, a detent arm having a projection normally engaged by said auxiliary lever for holding the valve open, a fusible link coöperating with said detent projection to hold the valve open, said fusible link preventing movement of the auxiliary lever on its fulcrum, and a spring urging said detent to a position to engage the lever and prevent the return motion thereof after it has been released.

6. In combination, a valve, a casing therefor, a spring normally urging said valve to closed position, a main lever fulcrumed in said valve casing and connected to the valve so as to control its position, an auxiliary lever fulcrumed upon said main lever, a fusible link holding said levers together to prevent relative motion between them, a swinging arm, a pin on said arm adapted to engage said auxiliary lever so as to hold said valve in open position, a spring tending to hold said pin and said auxiliary lever in engagement with each other and pull cord attached to said main lever or adapted to move the same and thereby force the valve to closed position, said pull cord being trained over a portion of said arm and deflected so as to retract said pin and release the auxiliary lever when the cord is pulled.

7. In a shut off valve, a valve casing, a valve adapted to seat therein, a lever outside of the casing having connections with the valve for controlling the latter, and a manually operated pivoted element having a portion adapted to swing to a position behind said lever to thereby hold the valve in closed position.

8. In a shut off valve, a valve casing, a valve adapted to seat therein, a lever connected to said valve for controlling it, and a pivoted detent adapted to hold said lever and the valve in open position, said detent having a portion adapted to engage and lock said lever when the latter is in closed position.

In witness whereof, we have hereunto subscribed our names in the presence of two witnesses.

WILLIAM SCHULZE.
HARRY A. SMITH.

Witnesses:
M. WALTER RONGSON, Jr.,
WILLIAM G. GUNTHER.